United States Patent
Liu et al.

Patent Number: 6,029,790
Date of Patent: Feb. 29, 2000

[54] COMPOSITE RELEASE SLEEVE FOR A CLUTCH ASSEMBLY

[75] Inventors: Huiyao Liu, Troy, Mich.; Qinghong K. Gao, Laurinburg, N.C.; Richard Martello, Clarkston, Mich.

[73] Assignee: Meritor Heavy Vehicle Systems, LLC, Troy, Mich.

[21] Appl. No.: 09/166,386

[22] Filed: Oct. 5, 1998

[51] Int. Cl.$^7$ .................................................. F16D 23/14
[52] U.S. Cl. .......................................... 192/98; 192/113.5
[58] Field of Search ..................................... 192/98, 99 S, 192/110 B, 113.5; 384/29, 42, 912

[56] References Cited

U.S. PATENT DOCUMENTS

| | | | |
|---|---|---|---|
| 4,534,458 | 8/1985 | Ladin ........................................ | 192/98 |
| 4,579,203 | 4/1986 | Link ......................................... | 192/98 X |
| 4,579,211 | 4/1986 | Renaud ..................................... | 192/98 |
| 4,653,626 | 3/1987 | Limbacher ................................ | 192/98 |
| 4,808,015 | 2/1989 | Babcock ................................... | 384/609 |
| 4,850,467 | 7/1989 | Parzefall .................................. | 192/98 |
| 4,890,708 | 1/1990 | Kitano et al. ........................... | 192/98 X |
| 5,069,323 | 12/1991 | Takeuchi et al. ...................... | 192/110 B |
| 5,373,957 | 12/1994 | Gochenour et al. .................. | 192/98 X |

FOREIGN PATENT DOCUMENTS

| | | | |
|---|---|---|---|
| 2096262 | 10/1982 | United Kingdom ..................... | 192/98 |
| 2138514 | 10/1984 | United Kingdom ................... | 384/912 |

*Primary Examiner*—Richard M. Lorence
*Attorney, Agent, or Firm*—Howard & Howard

[57] ABSTRACT

A composite release sleeve includes a first cylindrical sleeve of a non-metallic material, and a second cylindrical sleeve of a metallic material. The composite release sleeve enables translation movement of a bearing such as a clutch release bearing, upon a guide element such as an input shaft. Preferably, the first cylindrical sleeve material is a polymer composite having a molded-in second cylindrical sleeve such as a bronze bushing. An integral flange extending outwardly from one end of the first cylindrical sleeve transfers the axial motion of the release sleeve to the clutch assembly. The first cylindrical sleeve further includes an integrally molded cavity which serves as a lubrication reservoir to reduce friction and facilitate slidable movement of the composite release sleeve along the input shaft.

13 Claims, 2 Drawing Sheets

COMPOSITE RELEASE SLEEVE FOR A CLUTCH ASSEMBLY

BACKGROUND OF THE INVENTION

The present invention relates to a release bearing assembly in a pull-type friction clutch, and more particularly, to a composite release sleeve for use in the release bearing assembly.

Generally, to shift a common pull-type clutch, a clutch pedal actuates a release fork within a vehicle clutch assembly. The clutch fork actuates a release sleeve which disengages a clutch disk assembly from an engine flywheel. The release sleeve is actuated axially along the rotating input shaft to transfer the linear clutch fork motion to the rotating clutch disk assembly. The release sleeve thus slidably supports the clutch fork and release bearing assembly directly on the input shaft. As the release sleeve is in constant contact with the rotating input shaft it must resist a great amount of frictional wear. The release sleeve is thus commonly fabricated from a high tensile steel material.

However, known steel release sleeves add to the weight of the release bearing assembly thereby increasing the actuation force necessary to operate the clutch fork and initiate a shift. Additionally, due to the similarity of materials, known steel release sleeves have been found to embedded material particles into the steel input shaft. After a number of operating cycles the embed particles increase frictional forces and wear between the shaft and the release sleeve. Such frictional increase may therefore lead to an undesirable increase in the pedal effort needed to release the clutch.

SUMMARY OF THE INVENTION

The present invention provides a composite release sleeve which enables translation movement of a bearing such as a clutch release bearing, upon a guide element such as an input shaft. The present invention combines the light weight of a polymer composite material with the wear resistance of a metallic material to provide rapid clutch actuation and reduced pedal effort.

The composite release sleeve includes a first cylindrical sleeve of a first material, and a second cylindrical sleeve of a second material. The first cylindrical sleeve faces the bearing bore and contains the second cylindrical sleeve which contacts the shaft.

Preferably, the first cylindrical sleeve material is a polymer composite having a molded-in second cylindrical sleeve such as a bronze bushing. The first cylindrical sleeve is press fit into the bearing bore and the inner surface of the second cylindrical sleeve contacts the shaft. As the second cylindrical sleeve contacts the shaft, the second sleeve does not have to extend along the full length of the first cylindrical sleeve.

An integral flange extending outwardly from one end of the first cylindrical sleeve transfers the axial motion of the release sleeve to the clutch levers. The flange includes an annular cavity located where the flange extends outwardly from the first cylindrical sleeve. The annular cavity can be integrally molded into the first cylindrical sleeve and serves as a lubrication reservoir to reduce friction and facilitate slidable movement of the composite release sleeve.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
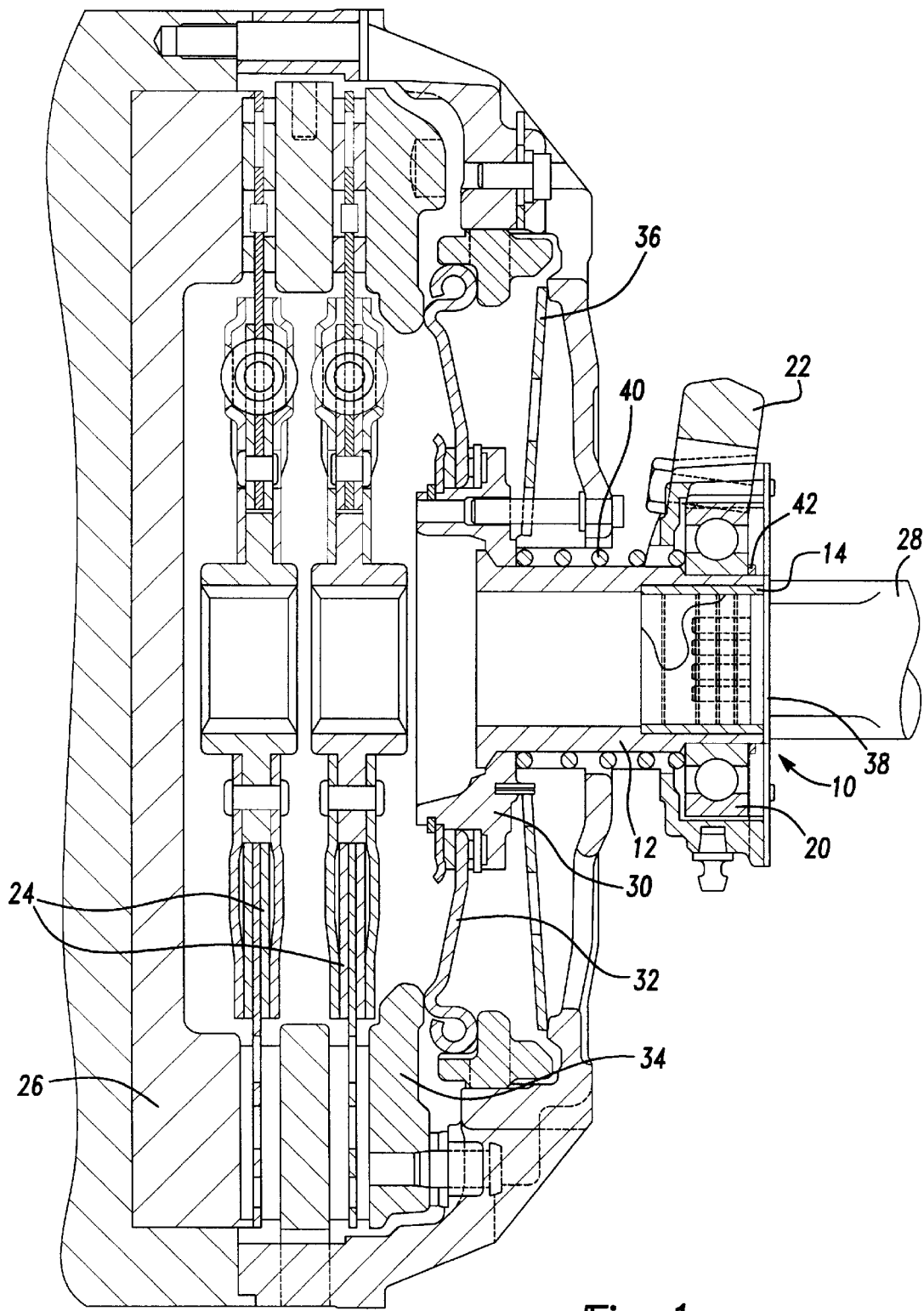
FIG. 1 is a sectional view of a clutch assembly showing the clutch release sleeve of the present invention.

A composite release sleeve 10 is shown installed in the clutch assembly of FIG. 1. The release sleeve 10 generally includes a first cylindrical sleeve 12 of a first material, and a second cylindrical sleeve 14 of a second material. The release sleeve 10 is installed in a release bearing assembly 20 and actuated by a clutch fork 22 driven by a vehicle clutch pedal (not shown) to disengage a clutch disk assembly 24 from an engine flywheel 26. The release sleeve 10 is slidably supported in direct contact to an input shaft 28 from a transmission (not shown). The release sleeve 10 is thus actuated axially along the rotating input shaft 28 to transfer linear clutch fork 22 motion to the rotating clutch disk assembly 24.

When the clutch pedal is operated, the clutch fork 22 pivots against the release bearing assembly 20 to slide the release sleeve 10 along the input shaft 28. The release sleeve 10 pulls against a clutch retainer 30 to operate the attached clutch lever assembly 32. The clutch levers 32 move away from a pressure plate 34 to disengage the clutch disk assembly 24 from the engine flywheel 26. When the clutch pedal is released a diaphragm spring 36 and a coil spring 40 creates pressure in the opposite direction against the release sleeve 10 and the above operation is reversed.

Figure 2:
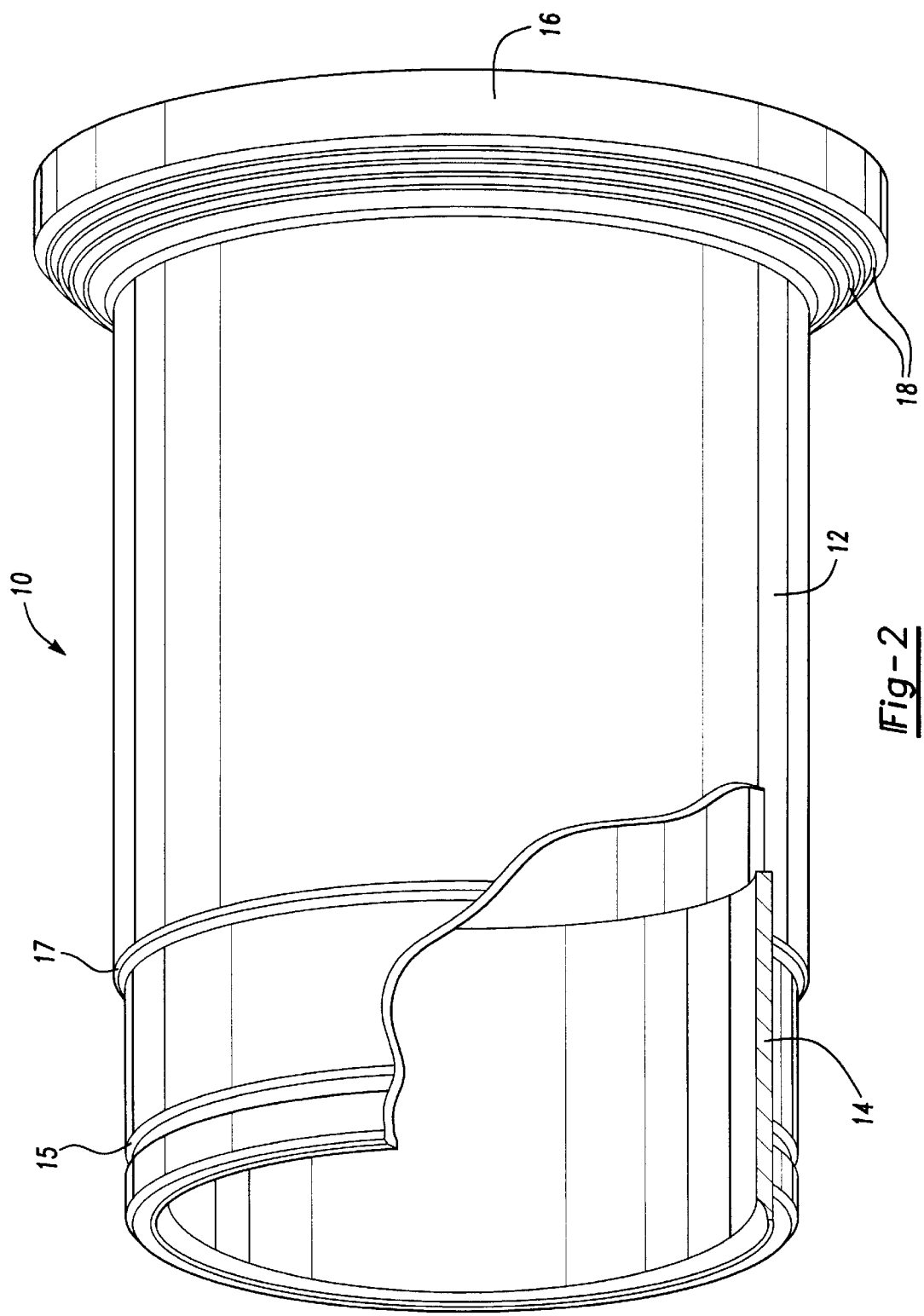
FIG. 2 is an exploded view of the clutch release sleeve shown in FIG. 1.

As shown in FIG. 2, the composite release sleeve 10 generally includes a first cylindrical sleeve 12 of a first material, and a second cylindrical sleeve 14 of a second material. The first cylindrical sleeve 12 faces a bearing bore 38 (FIG. 1) and provides a mounting surface for a release bearing assembly 20. The first cylindrical sleeve 12 is preferably press fit into the bearing bore 38 and is retained in a known manner by a retainer such as a snap ring 42 (FIG. 1). As the first cylindrical sleeve 12 is preferably molded from a polymer composite material a retaining ring groove 15 can be integrally molded into the release sleeve 10 thereby eliminating machining operations commonly required with previous steel release sleeves. The snap ring 42 (FIG. 1) fits within the retaining ring groove 15 to locate the release bearing assembly 20 between the snap ring 42 and a ledge 17 molded in the first cylindrical sleeve 12.

To provide resistance against the frictional forces generated between the composite release sleeve 10 and the rotating shaft 28 (FIG. 1) a second cylindrical sleeve 14 is molded within the first cylindrical sleeve 12. The second cylindrical sleeve 14 is preferably of a metallic material such as a bronze bushing. Further, as it is preferred that only the inner surface of the second cylindrical sleeve 14 is in contact with the input shaft 28, the second cylindrical sleeve 14 need not extend along the full length of the first cylindrical sleeve 12.

An integral flange 16 extending outwardly from one end of the first cylindrical sleeve 12 transfers the axial motion of the release sleeve 10 to the clutch lever assembly 32 (FIG. 1). The flange 16 includes at least one annular cavity 18 located where the flange 16 extends outwardly from the first cylindrical sleeve 12. The annular cavity 18 serves to reduce the friction forces between the release sleeve and the bearing assembly 20, particularly the clutch retainer 30. As the first cylindrical sleeve 12 is preferably molded from a polymer composite material, the cavity 18 can be integrally molded into the first cylindrical sleeve 12. Further, it will be realized that various quantities and configurations of cavity 18 can be molded directly into the outer surface of the release sleeve 10 dependant on the desired lubrication surfaces. The cavity 18 thus serves as a lubrication reservoir to further reduce friction and facilitate slidable movement of the composite release sleeve 10.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A clutch comprising:

a bearing assembly having a bearing bore;

a clutch release sleeve including a polymer composite cylindrical sleeve having an outer surface facing said bearing bore and an inner surface facing a shaft, and a bronze cylindrical sleeve having an outer surface facing said inner surface of said polymer composite cylindrical sleeve and an inner surface facing said shaft; and a clutch release fork pivotally attached to said bearing assembly, said clutch release fork axially actuating said clutch release sleeve along said shaft to engage or disengage a clutch disk assembly from an engine flywheel.

2. The clutch of claim 1, wherein said second cylindrical sleeve is molded in said first cylindrical sleeve.

3. The clutch of claim 1, wherein only said second cylindrical sleeve contacts said shaft.

4. The clutch of claim 1, wherein said first cylindrical sleeve is press-fit in said bearing bore.

5. The clutch of claim 1, wherein said second cylindrical sleeve extends for less than the full length of said first cylindrical sleeve.

6. The clutch of claim 1, further comprising a flange extending outwardly from one end of said first cylindrical sleeve.

7. The clutch of claim 6, further comprising an annular cavity located on an outer surface of said flange, said annular cavity serving as a lubrication reservoir.

8. The clutch of claim 7, wherein said annular cavity is integrally molded in said flange of said first cylindrical sleeve.

9. A clutch comprising:

a bearing assembly having a bearing bore;

a clutch release sleeve including a first cylindrical sleeve of a non-metallic material, said first cylindrical sleeve having an outer surface facing a bearing bore, an inner surface facing a shaft, and a flange extending outwardly from one end of said first cylindrical sleeve, and a second cylindrical sleeve of a metallic material molded in said first cylindrical sleeve, said second cylindrical sleeve having an outer surface facing said inner surface of said first cylindrical sleeve and an inner surface facing said shaft; and a clutch release fork pivotally attached to said bearing assembly, said clutch release fork axially actuating said clutch release sleeve along said shaft to engage or disengage a clutch disk assembly from an engine flywheel.

10. The clutch of claim 9, wherein said second cylindrical sleeve extends for less than the full length of said first cylindrical sleeve.

11. A clutch comprising:

a bearing assembly having a bearing bore;

a clutch release sleeve including a first cylindrical sleeve of a non-metallic material, said first cylindrical sleeve having an outer surface facing a bearing bore, an inner surface facing a shaft, and a flange extending outwardly from one end of said first cylindrical sleeve having an annular cavity located on an outer surface of said flange, said annular cavity serving as a lubrication reservoir, and a second cylindrical sleeve of a metallic material molded in said first cylindrical sleeve, said second cylindrical sleeve having an outer surface facing said inner surface of said first cylindrical sleeve and an inner surface facing said shaft; and a clutch release fork pivotally attached to said bearing assembly, said clutch release fork axially actuating said clutch release sleeve alone said shaft to engage or disengage a clutch disk assembly from an engine flywheel.

12. The clutch of claim 11, wherein said annular cavity is integrally molded in said first cylindrical sleeve.

13. The clutch of claim 9, further comprising an integrally molded retainer groove located opposite said flange.

* * * * *